US008001212B2

(12) United States Patent
Letz et al.

(10) Patent No.: US 8,001,212 B2
(45) Date of Patent: Aug. 16, 2011

(54) METHOD AND DATA PROCESSING SYSTEM FOR PROVIDING XML DATA

(75) Inventors: Stefan Letz, Boeblingen (DE); Roland Seiffert, Herrenberg (DE)

(73) Assignee: International Business Machines Corporation, Armonk, NY (US)

( * ) Notice: Subject to any disclaimer, the term of this patent is extended or adjusted under 35 U.S.C. 154(b) by 216 days.

(21) Appl. No.: 12/109,518

(22) Filed: Apr. 25, 2008

(65) Prior Publication Data

US 2008/0270573 A1    Oct. 30, 2008

(30) Foreign Application Priority Data

Apr. 27, 2007 (EP) .................................... 07107162

(51) Int. Cl.
 *G06F 15/16* (2006.01)
(52) U.S. Cl. .................. 709/217; 709/218; 709/237
(58) Field of Classification Search .................. 709/217, 709/218, 237
See application file for complete search history.

(56) References Cited

U.S. PATENT DOCUMENTS

| | | | |
|---|---|---|---|
| 6,996,773 B2 * | 2/2006 | Friedman et al. | 715/240 |
| 2005/0091589 A1 * | 4/2005 | Ramarao | 715/522 |
| 2006/0136985 A1 * | 6/2006 | Ashley et al. | 726/1 |
| 2006/0184656 A1 * | 8/2006 | Roddy | 709/223 |
| 2007/0250766 A1 * | 10/2007 | Medi et al. | 715/513 |
| 2008/0040657 A1 * | 2/2008 | Kuznetsov et al. | 715/234 |

* cited by examiner

*Primary Examiner* — Wing F Chan
*Assistant Examiner* — David X Yi
(74) *Attorney, Agent, or Firm* — Dennis Jung

(57) ABSTRACT

A method and systems for providing XML data is disclosed. In accordance with an embodiment of the invention, a second data processing system, which is connected to a first data processing system via a network, receives a first request over the network from the first data processing system. The first request comprises specifications for subsequent transfers of XML data from the second data processing system to the first data processing system. The specifications specify for which type of XML documents to be transferred in subsequent transfers to the first data processing system which excerpts of XML data shall be sent. An acknowledge message, sent to the first data processing system from the second data processing system, indicates the latter's ability to provide the excerpts of XML data for the types of XML documents in the subsequent data transfers.

16 Claims, 4 Drawing Sheets

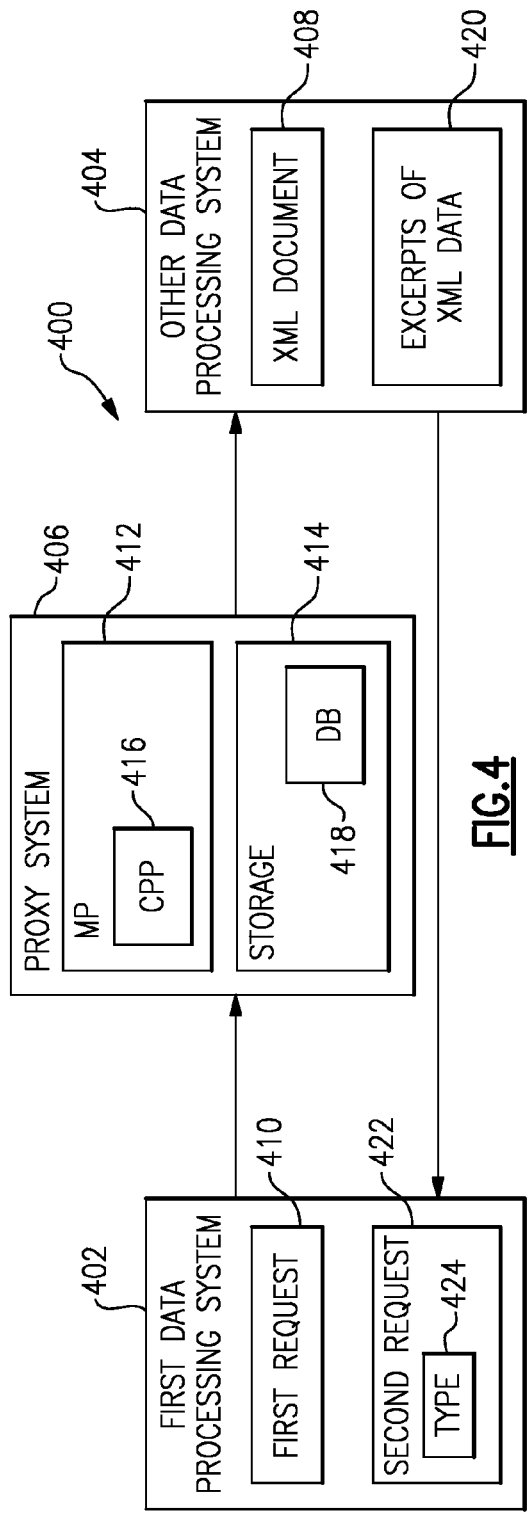
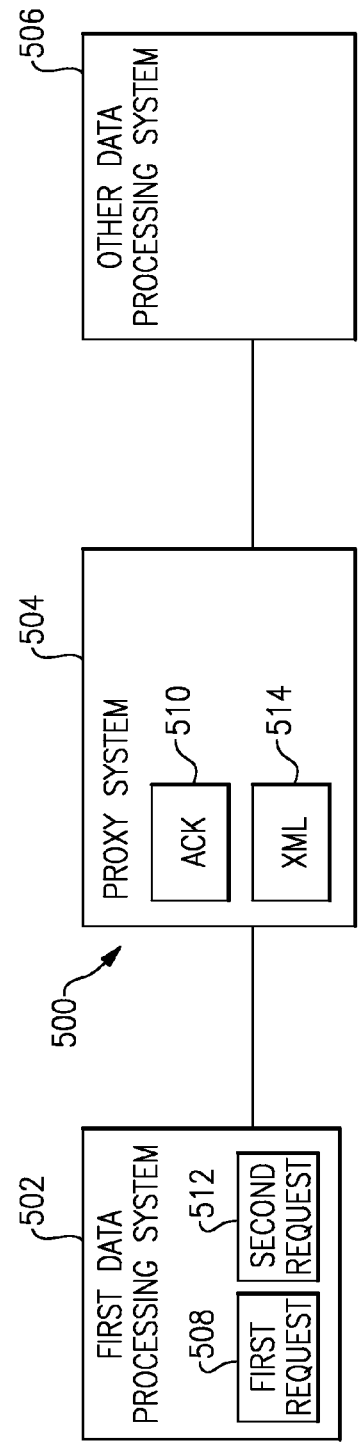
FIG.4
FIG.5

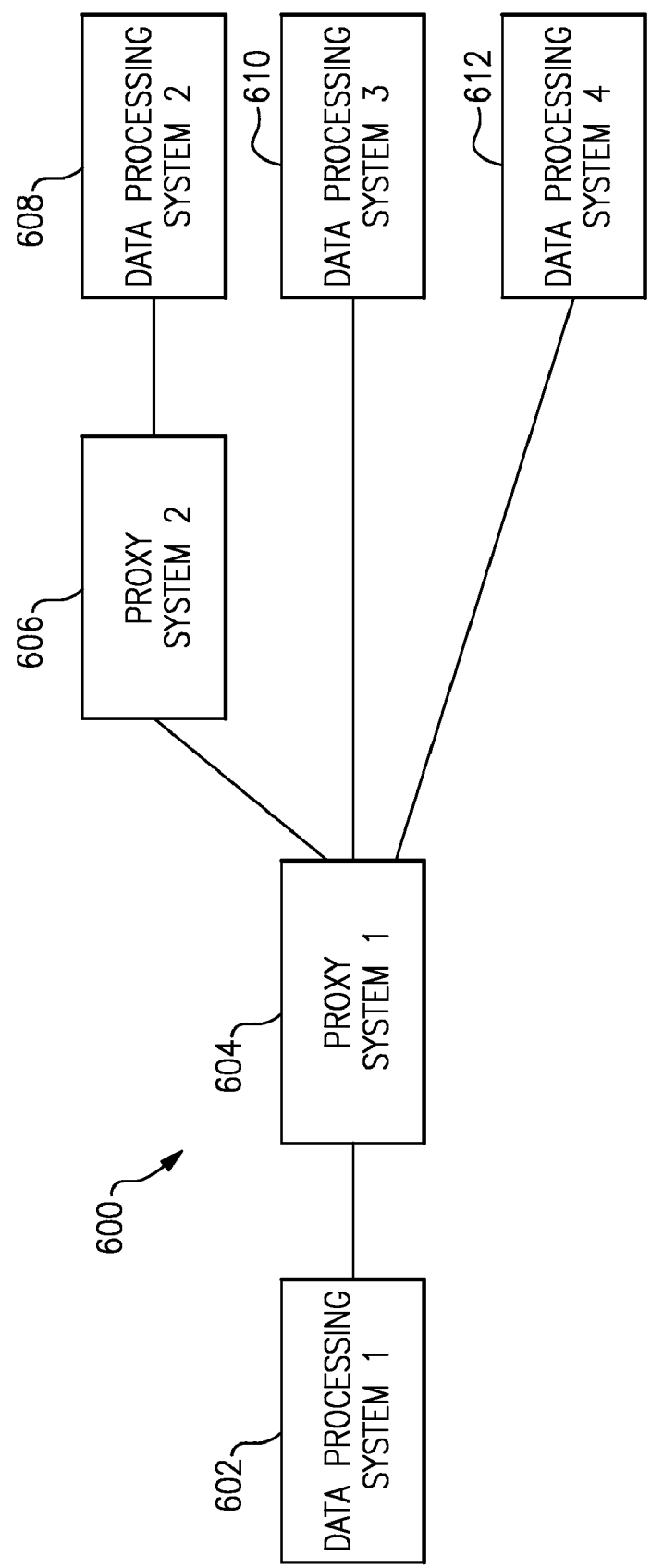

METHOD AND DATA PROCESSING SYSTEM FOR PROVIDING XML DATA

FIELD OF THE INVENTION

The invention relates to a method of providing XML data to a data processing system, to a computer program product adapted to perform the method in accordance with the invention, and to a data processing system.

BACKGROUND

The extensible markup language (XML) is a W3C-recommended general purpose markup language that supports a wide variety of applications. XML languages or 'dialects' are easy to design and to process. They are also reasonably human-legible, and to this end, terseness was not considered essential in its structure. XML is a simplified subset of standard generalized markup language (SGML). Its primary purpose is to facilitate the sharing of data across different information systems, particularly systems connected via the (public) internet.

XML provides text based means to describe and apply a tree based structure to information. At its base level, all information manifests as text, interspersed with markup that indicates the information's separation into a hierarchy of character data, container like elements, and attributes of those elements.

SAX is a serial access parser API for XML. API is an acronym for application programming interface which is a source code interface that a computer system or program library provides in order to support requests for services to be made of it by a computer program. SAX provides a mechanism for reading data from an XML document. A parser which implements SAX handles XML information as a single stream of data. This data stream is unidirectional, such that previously accessed data cannot be re-read without re-parsing. SAX is fast and efficient to implement, but difficult to use for extracting information at random from the XML document, since it tends to burden the application author with keeping track of what part of the document is being processed. It is better suited to situations in which certain types of information are always handled the same way, no matter where they occur in the document.

DOM is another interface oriented API that allows for navigation of an entire XML document as if it were a tree of 'node' objects representing the document's contents. A DOM document can be created by a parser from an XML document or can be generated manually by users. Data types in DOM nodes are abstract and implementations provide their own programming language specific bindings. DOM implementations tend to be memory intensive, as they generally require the entire document to be loaded into memory and constructed as a tree of objects before access is allowed.

RAX which is an acronym for random access XML relates to a further API for processing XML data. RAX can be understood as a new parsing model which is neither DOM nor SAX, but a machine-based, micro-based parallel processing strategy implemented in purpose built XML hardware. The core technology employed in RAX is an XPath engine. XPath is a language for addressing elements in an XML document. It can be understood as an XML document query language for making assertions about the content in XML documents. RAX processes an XML document by generating XPath expressions from the XML document, such that there is one XPath expression corresponding to each item in the XML document, whereby each XPath expression selects only the corresponding XPath item. The XPath expressions may be generated with a script. When an item is to be selected from the XML document, the XPath expressions are evaluated simultaneously in order to select the item from the generated XPath expressions. Each XPath expression produces a truth value indicating whether it is matched or not. The uniqueness constraint guarantees that one and only one XPath will have the truth value "TRUE". The position of the matching XPaths provides an index to the corresponding item in the XML document or in a derived list which represents the XML document.

The processing of XML documents is done by the data processing system which receives the XML document, for example via a network from a server. Such a data processing system is also referred to as application system as an application executed by the data processing system further processes the XML document. In order to be able to process large XML documents, the data processing system must however provide sufficient resources which might not always be the case. Furthermore, due to the increased size of XML documents for example in comparison with raw data, XML based communication requires more network bandwidth and network processing when transferring the XML document from the server to the receiving data processing system.

The problem of low XML parsing performance is addressed by trying to implement faster parsers. However, the possibilities for further improvements of these parsers are limited because XML parsing is very sequential by nature and inherently involves a large processing overhead. Since even with fast parsers, the parsing is still done on application systems, these systems are relieved only marginally. It is an object of the invention to describe an improved method of providing XML data to the data processing system corresponding to the application system which makes use of the XML data. It is a further object of the invention to provide an improved data processing system.

SUMMARY OF THE INVENTION

According to a first aspect of the invention, there is provided a method of providing XML data to a first data processing system. In accordance with an embodiment of the invention, the method is performed by a second data processing system which is connected to the first data processing system via a network. According to a step of the method, the second data processing system receives a first request over the network from the first data processing system. The first request comprises specifications for subsequent data transfers of XML data, wherein the specifications specify for which type of XML documents which excerpts of XML data from the XML documents shall be sent to the first data processing system. In a further step, the second data processing system sends an acknowledge message to the first data processing system. The second data processing system indicates via the acknowledge message its ability to provide the excerpts of XML data of the types of XML documents in the subsequent data transfers.

The first data processing system can for example be a client system which is served by the second data processing system over the network via a publish/subscribe (pub/sub) service. The first and second data processing systems can therefore be parts of a publish/subscribe system, wherein the first data processing system corresponds to a publisher which posts requests to the second data processing system which can be seen as a broker that provides responses to the first data processing system with respect to the requests.

The first and second data processing systems set up further transfers of XML data by use of the first request which is acknowledged via the acknowledge message. In the first request, the first data processing system specifies which excerpts of XML data it wants to receive when it asks via subsequent requests for the corresponding types of XML documents. The term 'type of XML documents' relates to a class of XML documents which can be for example specified according to the type of the document type definition (DTD). The first request is therefore used by the first data processing system to set up the second data processing system, which can be regarded as a broker, with respect to which excerpts of XML data shall be sent when the first data processing system requests via further communication steps for a specific type of XML documents.

In accordance with an embodiment of the invention, the second data processing system receives a second request from the first data processing system. The first data processing system requests via the second request for a type of XML documents from the second data processing system. In a further step, the second data processing system selects the excerpts of XML data from the XML documents having the corresponding type which shall be sent with respect to the type of XML documents according to the specifications. In a further step, the excerpts of XML data are sent over the network to the first data processing system. Thus, instead of providing the complete XML documents of the type requested for by the first data processing system, the second data processing system selects the excerpts of XML data that are specified for the type of XML documents from the corresponding XML documents. The method in accordance with the invention is therefore particularly advantageous as the first data processing system only receives the excerpts of XML data and must therefore only process the received excerpts of XML data and not the full XML documents. Thus, the first data processing system has to employ fewer resources for processing the received XML data. Further, fewer network resources have to be employed for the transfer of the excerpts of XML data in comparison with the network resources that must be employed to transfer the complete XML documents via the network from the second data processing system to the first data processing system.

In accordance with an embodiment of the invention, the type of XML documents relates to an XML document. The first and/or second request comprises a document identifier for the XML document. The document identifier is employed by the second data processing system to identify the XML document from which the excerpts of XML data are to be extracted. The document identifier can for example relate to the name of the XML document or to the URL (universal resource locator) under which the XML document can be retrieved.

In accordance with an embodiment of the invention, the excerpts of XML data are sent in one or more data packets. The last data packet of the one or more data packets comprises an end of stream information in order to indicate to the first data processing system that the last data packet is the latest data packet sent by the second data processing system and that no further data packet will be sent by the second data processing system with respect to the delivery of the excerpts of XML data requested via the second request.

In accordance with an embodiment of the invention, the specifications comprise binary format identifiers, wherein a binary format identifier specifies the format in which an excerpt of XML data associated with a specific type of XML documents shall be sent by the second data processing system. The first data processing system specifies therefore in the first request the binary format in which the first data processing system expects to receive the excerpts of XML data associated with a specific type of XML documents if it requests for these excerpts of XML data in requests such as for example the above mentioned second request. Formats that can for example be specified by a binary format identifier are: UTF-8 encoded strings, UTF-16 encoded strings, signed 32-bit integer, signed 64-bit integer, unsigned 32-bit integer, unsigned 64-bit integer, single precision IEEE-compliant floating point number, and double precision IEEE-compliant floating point number.

In accordance with an embodiment of the invention, the excerpts of XML data are returned in a predefined binary format. This provides the advantage that no binary format identifiers have to be specified in the request.

In accordance with an embodiment of the invention, the second request further comprises a characterization for each excerpt of XML data to be extracted by the second data processing system from one or more XML documents. A characterization might for example relate to an element name of the corresponding excerpt of XML data that shall be selected from one or more XML documents. A characterization might also relate to an XPath expression which can be used to extract the corresponding excerpt of XML data from an XML document.

In accordance with an embodiment of the invention, the second request comprises a filter list, wherein the filter list comprises a set of filter pairs, wherein each filter pair of the set of filter pairs provides a characterization for an excerpt of XML data and a binary format identifier for the excerpt of XML data. The characterization can be used by the second data processing system to select the corresponding excerpt of XML data from an XML document. As mentioned above, the characterization can for example be an element name specifying the excerpt of XML data or an XPath expression. The binary format identifier specifies the format in which the first data processing system wishes to receive the excerpt of XML data from the second data processing system.

In accordance with an embodiment of the invention, the documents of the corresponding type requested for via the second request are available to the second data processing system in an internal data representation. The excerpts of XML data requested with respect to the type of XML documents are generated from the internal data representation of the documents. The internal data representation can for example be generated from a specific XML document by applying a SAX API. The internal data representation of this XML document might be stored in the memory which is accessible by a processor of the second data processing system. The processor can then access the internal data representation and generate the requested excerpts of XML data. The generation of requested excerpts of XML data directly from the internal data representation has the advantage that the excerpts of XML data can be extracted very rapidly from the internal data representation and hence, the time required to deliver the requested excerpts of XML data to the first data processing system is reduced in comparison with the generation of the excerpts of XML data from the XML documents.

In accordance with an embodiment of the invention, the documents of the type requested for via the second request relate to one or more XML documents stored on the second data processing system. The second data processing system parses then the one or more XML documents in order to extract the excerpts of XML data which shall be sent with respect to the corresponding type of XML documents as set up via the first request. The XML documents can for example be stored on a storage medium of the second data processing system such that a processor running a SAX or DOM parser is able to parse the XML documents and select the specified excerpts of XML data.

According to a second aspect of the invention, there is provided a method for providing XML data to a first data processing system. In accordance with an embodiment of the invention, the method is performed by the first data processing system which is connected to a second data processing system via a network. According to a step of the method, the first data processing system sends a first request over the network to the second data processing system. The first request comprises specifications for subsequent data transfers of excerpts of XML data of types of XML documents. The specifications specify for which type of XML documents which excerpts of XML data shall be sent to the first data processing system. According to a further step of the method, the first data processing system receives an acknowledge message from the second data processing system. The second data processing system indicates via the acknowledge message its ability to provide the excerpts of XML data for the types of XML documents in subsequent data transfers.

According to a third aspect of the invention, there is provided a computer program product with computer executable instructions, wherein the instructions are adapted to perform one of the methods in accordance with the invention.

In accordance with an embodiment of the invention, the computer program product comprises a computer useable medium including a computer readable program, wherein the computer readable program when executed on a computer causes the computer to:

receive a first request over the network from the first data processing system, the first request comprising specifications for subsequent transfers of XML data from the second data processing system to the first data processing system, wherein the specifications specify for which type of XML documents which excerpts of XML data shall be sent to the first data processing system, and send an acknowledge message to the first data processing system, the second data processing system indicating via the acknowledge message its ability to provide the excerpts of XML data of the types of XML documents in the subsequent data transfers.

According to a fourth aspect of the invention, there is provided a data processing system, the data processing system relates to a second data processing system in a network which also comprises a first data processing system. The second data processing system comprises means for receiving a first request over the network from the first data processing system, wherein the first request comprises specifications for subsequent data transfers of XML data, wherein the specifications specify for which type of XML documents which excerpts of XML data shall be sent to the first data processing system. The second data processing system also has means for sending an acknowledge message to the first data processing system, wherein the second data processing system indicates via the acknowledge message its ability to provide the excerpts of XML data for the types of XML documents in the subsequent data transfers.

According to a fifth aspect of the invention, there is provided a data processing system. The data processing system relates to a first data processing system in a network comprising the first data processing system and a second data processing system. The first data processing system has means for sending a first request over the network to the second data processing system. The first request comprises specifications for subsequent data transfers of XML data, wherein the specifications specify for which type of XML documents which excerpts of XML data shall be sent to the first data processing system. The first data processing system further has means to receive an acknowledge message from the second data processing system. The acknowledge message is used by the second data processing system to indicate the ability to provide the excerpts of the XML data for the types of XML documents in the subsequent data transfers to the first data processing system.

According to a sixth aspect of the invention, there is provided a proxy system in a network that also contains at least a first data processing system according to embodiments of the invention and another data processing system which might be a second data processing system according to embodiments of the invention. In accordance with an embodiment of the invention, the proxy system is adapted to comprise the functionalities of the first and/or second data processing systems in accordance with the invention. In accordance with an embodiment of the invention, the proxy system is adapted to perform steps of the methods in accordance with the invention.

As described above, the first data processing system is adapted to send the first request to another data processing system. The first request is used to specify which excerpts of XML data the first data processing system expects to receive when it requests via subsequent requests for the corresponding types of XML documents. The proxy system is adapted to intercept this first request and to determine whether the other data processing system is a second data processing system in accordance with the invention. If this is not the case, the proxy system takes the role of the second data processing system and sends an acknowledge message to the first data processing system. The proxy system is adapted to intercept a subsequent second request from the first data processing system to the other data processing system, to retrieve the XML documents requested for in the second request, to parse those XML documents, for example using a SAX API, and to send the excerpts of XML data as specified in the first request back to the first data processing system.

If the other data processing system is a second data processing, the proxy system sends the first request to this second data processing system, and will intercept and forward subsequent second requests from the first data processing system to this second data processing system.

The proxy system is particularly advantageous because the provision of the excerpts of XML data by the other (second) data processing system is transparent to the first data processing system. The first data processing system can therefore always set up a transfer of excerpts of XML data in accordance with the methods in accordance with the invention if at least a proxy system is comprised in the network and located between the first data processing system and other data processing systems since the proxy system is adapted to act as second data processing system in accordance with the invention.

BRIEF DESCRIPTION OF THE DRAWINGS

In the following embodiments of the invention are exemplary described in greater detail by making reference to the drawings in which:

FIG. 4 shows a schematic block diagram of a network comprising a first data processing system, another data processing system, and a proxy system;

FIG. 5 shows a schematic block diagram of a network comprising a first data processing system, another data processing system, and a proxy system; and FIG. 6 shows a schematic block diagram of a network comprising multiple data processing systems and proxy systems.

DETAILED DESCRIPTION OF THE INVENTION

Figure 1:
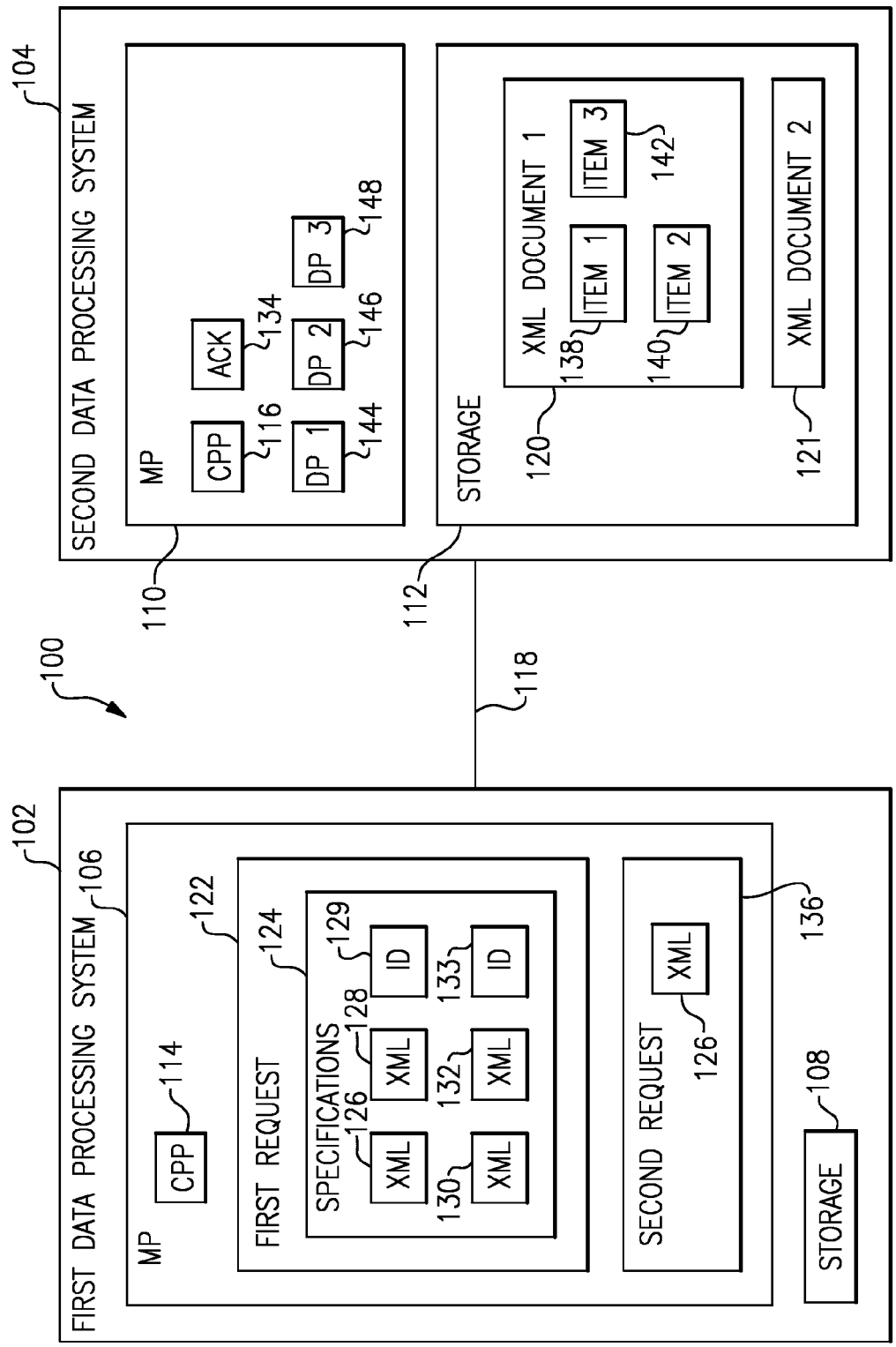
FIG. 1 is a schematic block diagram of a network comprising a first data processing system and a second data processing system.

FIG. 1 shows a schematic block diagram of a network 100 comprising a first data processing system 102 and a second data processing system 104. The first data processing system 102 comprises a microprocessor 106, and a storage 108. The second data processing system 104 comprises a microprocessor 110, and a storage 112.

The microprocessor 106 of the first data processing system 102 executes a computer program product 114 which might for example be permanently stored on the storage 108 and which is loaded for execution into the microprocessor 106. Similarly, the microprocessor 110 of the second data processing system 104 executes a computer program product 116 which is loaded from the storage 112 into the microprocessor and which is permanently stored on the storage 112.

The first data processing system 102 and the second data processing system 104 are connected over the network connection 118.

The first data processing system 102 can be regarded as a client system which is served by the second data processing system 104 over the network 100 via a pub/sub service. The second data processing system 104 might therefore hold XML documents, such as XML document 120 and XML document 121 on the storage 112. Each of the XML documents, such as the XML documents 120 and 121, relates to an XML document type, and hence to a class of XML documents.

The first data processing system 102 might want to receive data comprised in one of the XML documents held on the second data processing system 104 for further usage. In order to set up a communication between the first data processing system 102 and the second data processing system 104 through which the first data processing system 102 can request XML data from the second data processing system, the computer program product 114 generates a first request 122. The first request 122 comprises specifications 124.

The specifications 124 specify a first type of XML documents 126, and further provide characterizations for excerpts of XML data 128 that specify which excerpts of XML data are to be extracted and sent from the XML documents of the first type 126. The specifications 124 further comprise a first binary format identifier 129 which specifies the binary format in which the excerpts of XML data are to be sent.

Further, the specifications 124 specify a second type of XML documents 130, and further provide characterizations for excerpts of XML data 132, and a second binary format identifier 133. The characterizations for the excerpts of XML data 132 indicate which excerpts of XML data of XML documents of the second type 130, e.g., XML document 121, are to be sent to the first data processing system 102 in the binary format specified by the second binary format identifier 133. The first request 122 is then sent over the network connection 118 to the second data processing system 104.

The second data processing system 104 receives the first request 122. The computer program product 116 might then generate an acknowledge message 134 which is sent over the connection 118 to the first data processing system in order to indicate the ability to provide the excerpts of XML data according to the specifications 124 for the types of XML documents 126 and 130, respectively, in subsequent data transfers.

The computer program product 114 of the first data processing system 102 generates then a second request 136. The second request 136 is used to request for XML documents of the first type 126. The second request 136 is sent over the network connection 118 to the second data processing system 104. The computer program product 116 analyzes the second request 136 and determines the XML documents held on the storage 112 which are of the first type 126. It is assumed that the first XML document 120 is of the first type. The computer program product 116 selects then items 138, 140, and 142 from the first XML document 120, wherein the items 138, 140, and 142 correspond to the excerpts of XML documents that have been specified by use of the characterizations of excerpts of XML data 128 in the previous first request 120 to be sent when it is requested for the first type of XML documents 126. The items 138, 140, and 142 are then packed into data packets 144, 146, and 148. The data packets 144, 146, and 148 are transmitted over the network connection 118 to the first data processing system 102, so that the first data processing system receives the requested excerpts of XML data corresponding to the items 138 to 142.

Figure 2:
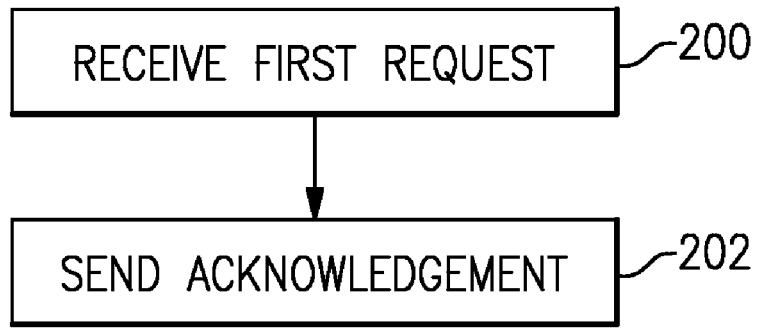
FIG. 2 is a flow diagram illustrating steps of a method in accordance with the invention.

FIG. 2 shows a flow diagram which illustrates steps of a method in accordance with the invention. The method is performed by a second data processing system in a network which further comprises the first data processing system. According to step 200, a first request is received over the network from the first data processing system by the second data processing system. The first request comprises specifications for subsequent data transfers of XML data, wherein those specifications specify for which type of XML documents which excerpts of XML data shall be sent to the first data processing system. According to step 202, an acknowledge message is sent to the first data processing system indicating the ability of the second data processing system to provide the excerpts of XML data for the types of XML documents in subsequent data transfers.

Figure 3:
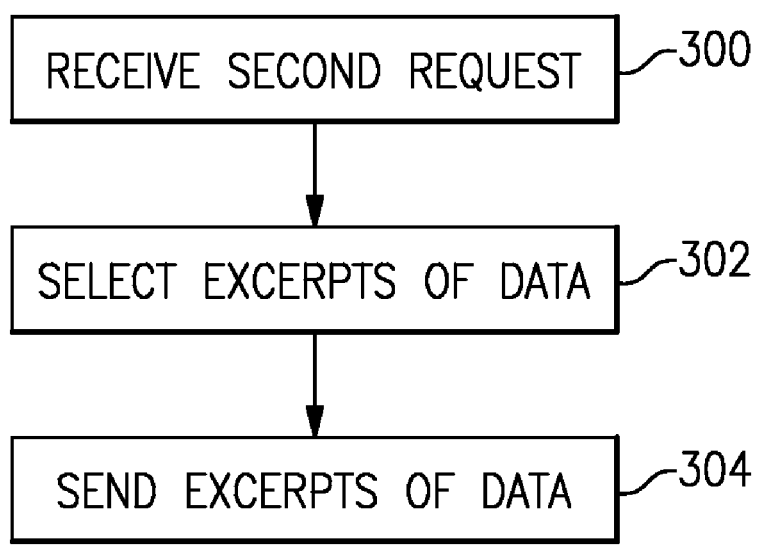
FIG. 3 shows a flow diagram illustrating steps of a method in accordance with the invention.

FIG. 3 shows a flow diagram illustrating steps of a method in accordance with the invention. The method is performed by a second data processing system which is connected via a network with a first data processing system. According to step 300, the second data processing system receives a second request from the first data processing system, wherein the first data processing system requests for a specific type of XML documents from the second data processing system. According to step 302, the second data processing system selects excerpts of XML data as specified in a previous first request for the type of XML documents from the documents having the corresponding type. According to step 304, the excerpts of XML data are sent over the network to the first data processing system.

FIG. 4 shows a block diagram of a network 400 comprising a first data processing system 402, another data processing system 404 which is a second data processing system in accordance with the invention, and a proxy system 406. The other data processing system 404 can be regarded as a server that holds XML documents, such as XML document 408 on a storage media. The first data processing system 402 can be regarded as a client which might want to process XML data contained in, e.g., the XML document 408.

In order to set up a communication with the other data processing system 404, the first data processing system sends a first request 410 to the other data processing system 404.

The first request 410 comprises specifications for subsequent data transfers of XML data, wherein the specifications specify for which type of XML documents requested for via a subsequent second request which excerpts of XML data shall be sent from the other data processing system 404 to the first data processing system 402. The first request 410 is intercepted by the proxy system 406.

The proxy system 406 comprises a microprocessor 412 and a storage 414. The microprocessor executes a computer program product 416 which is loaded from the storage 414 into the microprocessor 412. The storage further comprises a database 418. The computer program product 416 is used to determine, if the other data processing system 404 which is the destination of the first request 410 is a second data processing system in accordance with the invention and thus might be able to process the first request 410. For this, the computer program product accesses the database 418 in which all data processing systems comprised in the network 400 that are second data processing system in accordance with the invention are listed. If the other data processing system 404 is listed in the database 418, the proxy system 406 further forwards the first request 410 to the second data processing system 404. The second data processing system 404 might then send an acknowledge message to the first data processing system 402.

In order to receive excerpts of XML data 420 from the XML document 408, the first data processing system 402 might further send a second request 422 in which, for example, a type identifier 424 for the XML document 408 is included. The second request 422 is also intercepted by the proxy system 406 which forwards the second request 422 to the other (second) data processing system 404. The other (second) data processing system 404 is able to identify the XML document 408 by use of the type identifier 424 and extracts the excerpts of XML data 420 from the XML document 408. The excerpts of XML data 420 are then sent from the other (second) data processing system 404 to the first data processing system 402.

FIG. 5 shows a block diagram of a network 500 comprising a first data processing system 502, a proxy system 504, and another data processing system 506 which is not a second data processing system according to the invention. The first data processing system 502 can be regarded as a client who wishes to receive XML data from the other data processing system 506 which can be regarded as a server. For this, the first data processing system 502 sends the first request 508 to the other data processing system 506. The first request 508 comprises specifications for subsequent data transfers of XML data. The specifications specify for which type of XML documents requested for by the first data processing system which excerpts of XML data shall be sent to the first data processing system.

The first request is intercepted by the proxy system 504. The proxy system 504 is then able to determine, for example via a database as pointed out in the description to FIG. 4, that the other data processing system 506 is not able to process the first request 508, i.e., that the other data processing system 506 is not a second data processing system in accordance with the invention.

The proxy system 504 therefore sends an acknowledge message 510 to the first data processing system 502 indicating its ability to provide the excerpts of XML data for the types of XML documents as specified in the specifications, when the first data processing system 502 requests for it.

When the first data processing system 502 sends a second request 512 by which the first data processing system requests for XML data relating to a type of XML documents, the second request 512 is also intercepted by the proxy system 504. The proxy system 504 then requests the XML documents relating to the type of XML documents as specified in the second request 512 from the other data processing system 506. The proxy system 504 receives the XML documents from the other data processing system 506 and extracts the excerpts of XML data according to the specifications given in the first request from the obtained XML documents. The excerpts of XML data 514 are then sent by the proxy system 504 to the first data processing system 502.

FIG. 6 shows a schematic block diagram of a network 600. The network 600 comprises a data processing system 1 602, a proxy system 1 604, a proxy system 2 606, a data processing system 2 608, a data processing system 3 610, and a data processing system 4 612. The data processing system 1 602 can be regarded as a data processing system that comprises the functionality of the above described first data processing system. The data processing system 4 612 can be regarded as a data processing system that comprises the functionality of the above described second data processing system. The data processing system 2 608 can be regarded as a data processing system which is not adapted to implement the methods in accordance with the invention as described before. The same holds for the data processing system 3 610.

The proxy system 1 604 can be regarded as a data processing system that implements the functionality of the above described proxy system in accordance with the invention. The same holds for the proxy system 2 606.

The data processing system 1 602 might for example wish to receive excerpts of XML data from one or more XML documents from the data processing system 2 608. In order to set up a subsequent transfer of the excerpts of XML data, it therefore sends a first request to the data processing system 2 608. The first request comprises specifications that specify for which type of XML document which excerpts of XML data shall be sent to the data processing system 1 602. The proxy system 1 604 intercepts the first request and forwards the first request to the data processing system 2 608. The proxy system 1 604 might not be aware of the fact the data processing system 2 608 is not able to process the first request. The proxy system 1 604 therefore forwards the first request to the data processing system 2 608 in order to see if it receives an acknowledge message.

The first request is intercepted by the proxy system 2 606. The proxy system 2 606 forwards the first request to the data processing system 2 608 in order to find out if the data processing system 2 608 is able to process and handle the first request. As this is not the case, the proxy system 2 606 does not receive an acknowledge message from the data processing system 2 608.

The proxy system 2 606 therefore sends an acknowledge message in response to the reception of the first request to the proxy system 1 604. The proxy system 1 604 sends an acknowledge message to the data processing system 1 602. The data processing system 1 602 as well as the proxy system 1 604 therefore get the knowledge that further second requests in accordance with the invention will be served by the data processing system 608 though in fact the proxy system 2 606 will serve these requests. This is however transparent to the systems 602 and 604.

The data processing system 1 602 further sends a second request as described before to the data processing system 2 608. The proxy system 1 604 intercepts this second request and forwards the second request to the data processing system 2 608. The second request is then intercepted, processed, and answered by the proxy system 2 606.

Similarly, when the data processing system 1 602 requests XML data from the data processing system 3 610, the proxy system 1 604 acts as seen from the data processing system 1 602 as second data processing system in accordance with the invention and as seen from the data processing system 3 610 as first data processing system in accordance with the invention. The use of proxy systems in the network therefore ensures the interoperability between data processing systems in the network, wherein some data processing systems are adapted to perform the methods in accordance with the invention and wherein others are not.

A proxy system might not even be located on a separate node of the network 600. For example, the functionality of the proxy system 1 604 could be directly implemented into the data processing system 1 602, e.g., via a software component installed on this data processing system.

LIST OF REFERENCE NUMERALS

| | |
|---|---|
| 100 | Network |
| 102 | First data processing system |
| 104 | Second data processing system |
| 106 | Microprocessor |
| 108 | Storage |
| 110 | Microprocessor |
| 112 | Storage |
| 114 | Computer program product |
| 116 | Computer program product |
| 118 | Network connection |
| 120 | XML document |
| 121 | XML document |
| 122 | First request |
| 124 | Specifications |
| 126 | First type of XML documents |
| 128 | Characterizations of excerpts of XML data |
| 129 | First binary format identifier |
| 130 | Second type of XML documents |
| 132 | Characterizations of excerpts of XML data |
| 133 | Second binary format identifier |
| 134 | Acknowledge message |
| 136 | Second request |
| 138 | Item |
| 140 | Item |
| 142 | Item |
| 144 | Data packet |
| 146 | Data packet |
| 148 | Data packet |
| 400 | Network |
| 402 | First data processing system |
| 404 | Other data processing system |
| 406 | Proxy system |
| 408 | XML document |
| 410 | First request |
| 412 | Microprocessor |
| 414 | Storage |
| 416 | Computer program product |
| 418 | Database |
| 420 | Excerpts of XML data |
| 422 | Second request |
| 424 | Type identifier |
| 500 | Network |
| 502 | First data processing system |
| 504 | Proxy system |
| 506 | Other data processing system |
| 508 | First request |
| 510 | Acknowledge |
| 512 | Second request |
| 514 | Excerpts of XML data |
| 600 | Network |
| 602 | Data processing system |
| 604 | Proxy system |
| 606 | Proxy system |
| 608 | Data processing system |
| 610 | Data processing system |
| 612 | Data processing system |

What is claimed is:

1. A method of providing XML data to a first data processing system, the method being performed by a second data processing system, the second data processing system being connected to the first data processing system via a network, the method comprising:

receiving a first request over the network from the first data processing system, the first request comprising specifications for subsequent transfers of XML data from the second data processing system to the first data processing system, wherein the specifications specify for which type of XML documents which excerpts of XML data shall be sent to the first data processing system;

receiving a second request from the first data processing system, wherein the first data processing system requests to receive excerpts of XML data with respect to a type of XML documents from the second data processing system; selecting the excerpts of XML data according to the specifications from documents having the type;

wherein the type of XML documents relates to an XML document, wherein at least one of the first and second requests comprise a document identifier for the XML document, wherein the excerpts of XML data are comprised in the XML document, wherein the XML document identifier enables the second data processing system to identify the XML document;

sending the excerpts of XML data over the network to the first data processing system; and sending an acknowledge message to the first data processing system, the second data processing system indicating via the acknowledge message its ability to provide the excerpts of XML data of the types of XML documents in the subsequent data transfers.

2. The method according to claim 1, wherein the excerpts of XML data are sent in at least one data packet, wherein the last data packet of the at least one data packet comprises an end of stream information, wherein the end of stream information indicates to the first data processing system that this is the last data packet sent by the second data processing system.

3. The method according to claim 1, wherein the specifications comprise binary format identifiers, wherein a binary format identifier specifies the format in which an excerpt of XML data associated with a specific type of XML documents shall be sent by the second data processing system.

4. The method according to claim 1, wherein documents of the type of XML documents requested for via the second request are available to the second data processing system in an internal data representation, wherein the excerpts of XML data requested with respect to the type of XML data are generated from the internal data representation of the documents.

5. The method according to claim 1, wherein the type of documents requested for via the second request relates to at least one XML document, wherein the at least one XML document is parsed in order to extract the excerpts of XML data requested with respect to the type of XML data.

6. The method according to claim 1, wherein a proxy system is comprised in the network, wherein the proxy system intercepts the first request sent from the first data processing system to another data processing system, wherein the proxy system determines whether the other data processing system is able to process the first request, wherein the first request is sent to the other data processing system from the proxy system if the other data processing system is able to process the first request, and wherein the proxy system further forwards the second request to the other data processing system.

7. The method according to claim 6, wherein the proxy system sends the acknowledge message to the first data processing system, if the other data processing system is not able to process the first request, and wherein the proxy system further processes the second request by requesting the XML documents relating to the type of XML documents requested for via the second request from the other data processing system, by extracting the excerpts of XML data as specified in the first request from the XML documents, and by sending the excerpts of XML data to the first data processing system.

8. A computer program product comprising computer executable instructions stored on a non-transitory computer-readable storage medium, the instructions being adapted to perform a method of providing XML data to a first data processing system, the method being performed by a second data processing system, the second data processing system being connected to the first data processing system via a network, the method comprising:
receiving a first request over the network from the first data processing system, the first request comprising specifications for subsequent transfers of XML data from the second data processing system to the first data processing system, wherein the specifications specify for which type of XML documents which excerpts of XML data shall be sent to the first data processing system;
receiving a second request from the first data processing system, wherein the first data processing system requests a type of XML documents from the second data processing system; selecting the excerpts of XML data from the XML documents having the corresponding type which shall be sent with respect to the type of XML documents according to the specifications provided via the first request;
wherein the type of XML documents relates to an XML document, wherein at least one of the first and second requests comprise a document identifier for the XML document, wherein the excerpts of XML data are comprised in the XML document, wherein the XML document identifier enables the second data processing system to identify the XML document;
sending the excerpts of XML data over the network to the first data processing system; and
sending an acknowledge message to the first data processing system, the second data processing system indicating via the acknowledge message its ability to provide the excerpts of XML data of the types of XML documents in the subsequent data transfers.

9. A data processing system, wherein the data processing system includes a second data processing system in a network, the second data processing system being connected to a first data processing system via the network, the second data processing system comprising:
a processor;
a memory accessible by the processor, the memory including instructions stored thereon, the instructions configured to implement the steps of:
receiving a first request over the network from the first data processing system, the first request comprising specifications for subsequent transfers of XML data from the second data processing system to the first data processing system, wherein the specifications specify for which type of XML documents which excerpts of XML data shall be sent to the first data processing system;
receiving a second request from the first data processing system, wherein the first data processing system requests a type of XML documents from the second data processing system; selecting the excerpts of XML data from the XML documents having the corresponding type which shall be sent with respect to the type of XML documents according to the specifications provided via the first request;
wherein the type of XML documents relates to an XML document, wherein at least one of the first and second requests comprise a document identifier for the XML document, wherein the excerpts of XML data are comprised in the XML document, wherein the XML document identifier enables the second data processing system to identify the XML document;
sending the excerpts of XML data over the network to the first data processing system; and
sending an acknowledge message to the first data processing system, the second data processing system indicating via the acknowledge message its ability to provide the excerpts of XML data of the types of XML documents in the subsequent data transfers.

10. The data processing system according to claim 9, the data processing system being adapted to send the excerpts of XML data in at least one data packet, wherein the last data packet of the at least one data packet comprises an end of stream information, wherein the end of stream information provides an indication to the first data processing system that no further data packet will be sent by the second data processing system.

11. The data processing system according to claim 9, wherein the specifications comprise binary format identifiers, wherein a binary format identifier specifies the format in which an excerpt of XML data associated with a specific type of XML documents shall be sent by the second data processing system.

12. The data processing system according to claim 9, wherein documents of the type of XML documents requested for via the second request are available to the second data processing system in an internal data representation, wherein the second data processing system is adapted to generate the excerpts of XML data requested from the internal data representation of the documents.

13. The data processing system according to claim 9, wherein the type of documents requested for via the second request relates to at least one XML document, wherein the second data processing system is adapted to parse the at least one XML document in order to extract the excerpts of XML data requested with respect to the type of XML data.

14. A data processing system, wherein the data processing system includes a first data processing system in a network, the first data processing system being connected to a second data processing system via the network, the first data processing system comprising:
a processor;
a memory accessible by the processor, the memory including instructions stored thereon, the instructions configured to implement the steps of:
sending a first request over the network to the second data processing system, the first request comprising specifications for subsequent transfers of XML data from the second data processing system to the first data processing system, wherein the specifications specify for which type of XML documents which excerpts of XML data shall be sent to the first data processing system;
sending a second request from the first data processing system over the network to the second data processing system, wherein the first data processing system requests to receive excerpts of XML data with respect to a type of XML documents from the second data processing system; selecting the excerpts of XML data according to the specifications from documents having the type;
wherein the type of XML documents relates to an XML document, wherein at least one of the first and second requests comprise a document identifier for the XML document, wherein the excerpts of XML data are comprised in the XML document, wherein the XML document identifier enables the second data processing system to identify the XML document;

sending the excerpts of XML data over the network to the first data processing system; and receiving an acknowledge message from the second data processing system, the second data processing system indicating via the acknowledge message its ability to provide the excerpts of XML data of the types of XML documents in the subsequent data transfers.

15. The data processing system according to claim 9, wherein such data processing system is a proxy system.

16. The data processing system according to claim 14, wherein such data processing system is a proxy system.

* * * * *